United States Patent [19]

Hudson

[11] 3,844,143
[45] Oct. 29, 1974

[54] PINTLE HOOK LOCKING DEVICE
[76] Inventor: Ralph D. Hudson, 3911 Dill Rd., Drayton Plains, Mich. 48020
[22] Filed: May 4, 1973
[21] Appl. No.: 357,342

[52] U.S. Cl. .......................... 70/14, 70/34, 70/232
[51] Int. Cl. ...................... B60r 25/00, E05b 67/36
[58] Field of Search .......... 70/14, 34, 57, 232, 258, 70/DIG. 57

[56] References Cited
UNITED STATES PATENTS
1,617,204  2/1927  Errelalde ............................... 70/34
2,171,664  9/1939  McFarland .......................... 248/154
FOREIGN PATENTS OR APPLICATIONS
861,059  12/1952  Germany .............................. 70/14

Primary Examiner—Albert G. Craig, Jr.
Attorney, Agent, or Firm—Whittemore, Hulbert & Belknap

[57] ABSTRACT

The device is releasably applied coaxially to the forward towing hook of a trailer-type road vehicle, its function being to block access to the pintle-receiving circular bight of said hook. For this purpose the device comprises a circular upper locking plate of a diameter slightly in excess of the diameter of the hook in the medial annular zone thereof, thereby barring entry of a prying type of instrument for the purpose of forcing the device from the hook. Said upper plate has a fixed depending tubular sleeve, the outer diameter of which is slightly less than the inner diameter of the hook, so as to inhibit relative lateral horizontal shift of the hook and the device, and said sleeve telescopes downwardly over an upright semi-post formation fixedly mounted on a bottom circular locking plate of the same diameter as the upper plate. A connecting bolt passes through an eccentric opening in a disc fixed internally to the sleeve, threadedly engaging through the post part of the bottom plate and into the latter, thus releasably holding the plates in a locked condition in which they engage the pintle hook from top and bottom. The upper plate has an eccentric through-hole in vertical alignment with the holding bolt; and also eccentrically carries a tumbler-type rotary lock to which key access from the top of the device is had. Said lock has a horizontal arm on the rotary key-operated member thereof, which arm, in a locked condition of the device on the pintle hook, lies directly between the access opening in the upper plate and the vertically aligned holding bolt of the device, thus to prevent access by the bolt of a screwdriver-type tool blocking access of the latter to manipulate the bolt. In the unlocked condition, the arm is swung to one side to permit such access.

7 Claims, 3 Drawing Figures

PATENTED OCT 29 1974    3,844,143

3,844,143

PINTLE HOOK LOCKING DEVICE

BACKGROUND OF THE INVENTION

1. Field of the Invention

The device finds application in the effective locking of trailer-type vehicles, for example, heavy flatbeds, which are normally releasably coupled for travel to a truck or like traction vehicle by means of a so-called pintle engaging through the bight of the towing hook forward of the trailer frame. As such, the device is to be distinguished from certain ball and socket type coupling locking devices known to the art. Although applications to trailer structures are contemplated in the main, no doubt there are other types of installation in which the present improvement has advantageous application.

2. Description of the Prior Art

A search has revealed the following patents:

| | | | |
|---|---|---|---|
| Gallagher et al | 2,641,124 | Young | 3,269,159 |
| Lucas et al | 2,656,706 | Foote | 3,526,110 |

Of the above, the Foote patent appears to be the most pertinent, although still not qualifying under the criteria of 35 USC 102 or 103, inasmuch as it relates to a ball and socket type trailer coupler cover lock having no structural similarity to a lock presenting plates and telescoping plate components applied releasably in a blocking relationship to a pintle hook. The Young and Lucas et al patents lack pertinence in their disclosure of pivotally articulated handcuff type parts releasably applied in encircling relation to a tractor kingpin or hitch pin; while Gallagher et al discloses a device applicable to the depending kingpin of a trailer fifth wheel plate to prevent unauthorized interconnection of a traction vehicle to the trailer, in the form of a U-shaped shackle-type padlock key-operated from the exterior.

SUMMARY OF THE INVENTION

The locking device is extremely simple and inexpensive as to its construction in that it comprises mass produceable plate, sleeve, post and disc components which are readily assembled in a fixed relationship of certain thereof to others, as by welding or set screw. As proportioned for use in a way dictated by the size of the trailer's pintle hook, the device is in effect custom-designed; and its locking unit, per se, may well be a high cost one not accessible to being readily picked by a thief. Simple fixturing enables the respective upper and lower components to be weld-assembled; and the material of the parts of the device may be steel, aluminum or other metal or non-metallic composition.

DESCRIPTION OF A PREFERRED EMBODIMENT

Figure 1:
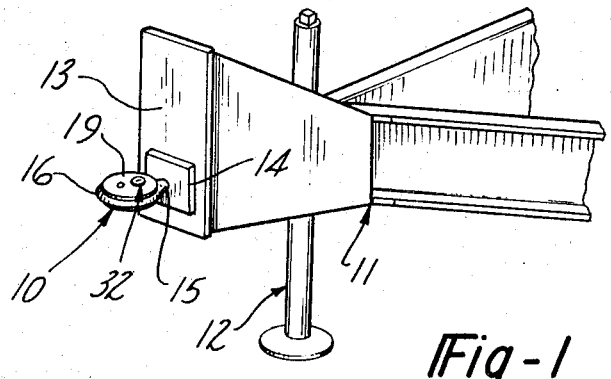
FIG. 1 is a fragmentary perspective view illustrating a typical application of the lock device to the forward draft structure of a flatbed trailer.

FIG. 1 shows the lock device, generally indicated by the reference numeral 10, as typically applied to the channel beam and plate forward draft or towing structure 11 of a flatbed type trailer, as parked and supported by the usual upright 12. Equally typically, this structure may feature a welded rectangular main front plate 13 and an auxiliary rigid plate 14 welded thereto and supporting the shank 15 of the circular coupling hook 16 of the installation. This is a heavy gage member presenting a circular bight 17 of predetermined inner diameter, to which the coupling pintle (not shown) of the traction vehicle is normally applied in a conventional way.

Figure 2:
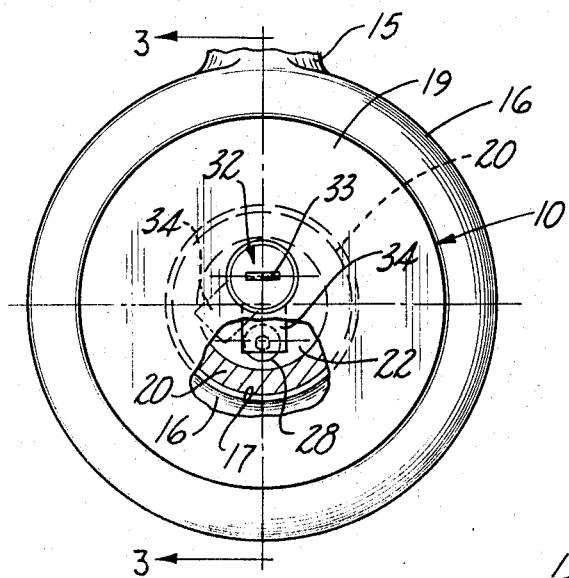
FIG. 2 is a fragmentary top plan view, partially broken away and in horizontal section on a line corresponding to line 2—2 of FIG. 3, of the device as applied per FIG. 1.
Figure 3:
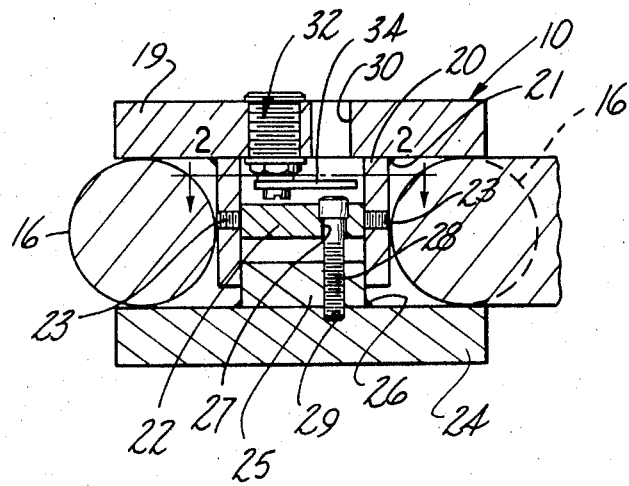
FIG. 3 is a fragmentary view in vertical section on line 3—3 of FIG. 2.

Now referring to FIG. 3 in conjunction with FIG. 2, the lock device 10 comprises one part in the form of a cylindrical disc 19 of substantial axial thickness, preferably of aluminum in the interest of lightness, or steel, which carries another part in the form of a sleeve 20 in depending relationship thereto, the parts 19 and 20 being shown as having a welded annular connection at 21 rendering them in effect a unitary component of the lock. Sleeve part 20 is provided medially of its axial length with a mounting plug or disc 22, which is fixedly held to the bore of sleeve 20, as by a plurality of radial set screws 23. In the alternative, a welded connection may be made, inasmuch as it is a permanent one.

Still another part of device 10 is a circular bottom plate 24 of the same diameter and thickness as upper plate 19; and plate 24 has a concentric center upright post member 25 fixedly secured thereto, as by an annular weldment 26, to in effect constitute a unitary bottom component of device 10.

The mounting disc 22 is provided with an eccentrically located, counterbored opening 27, which receives with reasonable clearance an Allen-type screw or stud 28, said member passing through a vertically aligned opening in post part 25 and threading into an eccentric recess 29 in bottom plate 24. The stud may also have a threaded connection in the opening of post element 25.

In order to normally accommodate an appropriate wrench or the like for access to stud 28 in coupling and locking the plates 19 and 24, the plate 19 is provided with a vertical opening 30 eccentric of its axis and at a radius enabling said opening to be in vertical register with stud 28 when the lock 10 is operatively applied to coupling hook 16, as illustrated in FIG. 3. Access to the stud to take it up threadedly is through opening 30; and similarly the plate components may be separated for unlocking device 10 by backing off the stud.

The upper plate 19 is equipped with a standard rotary barrel-type tumbler lock 32 presenting an upwardly exposed key opening 33, and the rotor of lock 32 is provided adjacent the bottom thereof with a horizontal, radially extending blocking arm or bar 34, whose length and width are such, as illustrated in solid line in FIG. 2, as to extend outwardly in the bore of sleeve part 20 sufficiently to in the main cover the head of the mounting screw or stud 28, and thereby physically intercept the application to the latter of an unauthorized wrench or equivalent tool through access hole 30 of top plate 19. Thus, the lock is effectively prevented from being removed from pintle hook 16 under anything approaching a reasonably possible effort. An authorized key operation of lock 32 swings blocking arm 34 from the solid line position of FIG. 2 to its dotted line position, thus exposing the bolt for a legitimate manipulation in decoupling the lock device from the trailer.

What is claimed is:

1. An anti-theft locking device releasably applicable to a coupling hook of a trailer type vehicle to thereby safeguard the latter by blocking effective access to the bight of said hook from the exterior thereof; said device comprising a first part insertable in said bight from one side of the hook, a second part in fixed relation to said first part and proportioned to overlie and effectively shield said hook in sufficient of the area of said bight to forestall an unauthorized effort to remove the device from said hook, a third part engageable with said first part from the side of said hook opposite said one side of the latter with said parts in releasable assembly, said portion of said third part being internally telescoped in a sleeve portion of the first part, the second part having an opening for access of a tool, screw means aligned with said access opening and acting to releasably hold said parts in antitheft assembly in the telescoped area of said portions, and lock means to prevent unauthorized actuation of said screw means.

2. An anti-theft locking device releasably applicable to a coupling hook of a trailer type vehicle to thereby safeguard the latter by blocking effective access to the bight of said hook from the exterior thereof; said device comprising a first part insertable in said bight from one side of the hook, a second part in fixed relation to said first part and proportioned to overlie and effectively shield said hook in sufficient of the area of said bight to forestall an unauthorized effort to remove the device from said hook, a third part engageable with said first part from the side of said hook opposite said one side of the latter with said parts in releasable assembly, said first part being a post-like one proportioned for a fit in said hook bight, the second part being a plate part proportioned to span the area of the bight, and the third part also being a plate part to span the bight and having a portion for a releasable telescoped engagement with said first part in said bight, said portion of said third part being internally telescoped in a sleeve portion of the first part, the second part having an opening for access of a tool, screw means aligned with said access opening and acting to releasably hold said parts in antitheft assembly in the telescoped area of said portions, and lock means to prevent unauthorized actuation of said screw means.

3. The locking device of claim 1, in which said lock means comprises a lock unit on one of said second and third parts having an element positionable into and out of a position in which it blocks access of the tool to said screw means.

4. The locking device of claim 2, in which said lock means comprises a lock unit on one of said second and third parts having an element positionable into and out of a position in which it blocks access of the tool to said screw means.

5. The locking device of claim 1, in which said lock means comprises a rotatable lock unit on said second part having an element swingable into and out of a position in which it blocks access of the tool to said screw means.

6. The locking device of claim 2, in which said lock means comprises a rotatable lock unit on said second part having an element swingable into and out of a position in which it blocks access of the tool to said screw means.

7. The locking device of claim 6, in which said hook is generally circular in contour and the area of said second plate part enables the latter to span well beyond the telescoped area of said portions of said first and third parts, the outer diameter of said sleeve portion of the first part being only a bit less than the inner diameter of said hook to inhibit relative lateral shift of the latter and the device.

* * * * *